(12) United States Patent
Cho et al.

(10) Patent No.: US 11,230,165 B2
(45) Date of Patent: Jan. 25, 2022

(54) METHOD AND SYSTEM FOR VARIABLY ADJUSTING INDOOR TEMPERATURE OF VEHICLE

(71) Applicants: Hyundai Motor Company, Seoul (KR); Kia Motors Corporation, Seoul (KR)

(72) Inventors: Jin Kyeom Cho, Gyeonggi-do (KR); Sung Bae Jeon, Gyeonggi-do (KR); Hui Un Son, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 77 days.

(21) Appl. No.: 16/439,267

(22) Filed: Jun. 12, 2019

(65) Prior Publication Data

US 2020/0180400 A1 Jun. 11, 2020

(30) Foreign Application Priority Data

Dec. 10, 2018 (KR) .......................... 10-2018-0158359

(51) Int. Cl.
*B60H 1/00* (2006.01)

(52) U.S. Cl.
CPC ..... *B60H 1/00892* (2013.01); *B60H 1/00778* (2013.01); *B60H 1/00792* (2013.01); *B60H 1/00964* (2013.01); *B60H 1/00978* (2013.01)

(58) Field of Classification Search
CPC ............ B60H 1/00892; B60H 1/00778; B60H 1/00964; B60H 1/00792; B60H 1/00757; B60H 1/00742

See application file for complete search history.

(56) References Cited

U.S. PATENT DOCUMENTS 5,054,686 A * 10/1991 Chuang .................. B60R 25/00
236/49.3
6,116,511 A * 9/2000 Jakobcic ............ B60H 1/00792
165/202

(Continued)

FOREIGN PATENT DOCUMENTS

KR 10-2016-0047253 A 5/2016
KR 10-2016-0051241 A 5/2016
KR 10-2018-0081294 A 7/2018

*Primary Examiner* — Kun Kai Ma
(74) *Attorney, Agent, or Firm* — Mintz Levin Cohn Ferris Glovsky and Popeo, P.C.; Peter F. Corless

(57) ABSTRACT

A method and system capable of variably adjusting an indoor temperature of a vehicle according to characteristics of an object to be protected in the vehicle when a driver has turned off the engine and exited the vehicle are provided. The method includes determining whether a current indoor temperature of the vehicle exceeds a predetermined allowable temperature of an object to be protected and switching an IG terminal of a key box of the vehicle to an ON state. A sustainable time of indoor temperature control of the vehicle is calculated in response to determining that the current indoor temperature of the vehicle exceeds the predetermined allowable temperature of the object to be protected. The indoor temperature of the vehicle is adjusted to be within a predetermined allowable temperature range or indoor air of the vehicle is circulated according to the sustainable time.

7 Claims, 3 Drawing Sheets

(56) References Cited

U.S. PATENT DOCUMENTS

| | | | |
|---|---|---|---|
| 8,232,874 B1* | 7/2012 | Aneiros | B60H 1/00657 340/438 |
| 2004/0100148 A1* | 5/2004 | Kindo | B60R 16/0315 307/66 |
| 2006/0021098 A1* | 1/2006 | Tezuka | H01H 47/002 477/7 |
| 2006/0179853 A1* | 8/2006 | Vosburgh | B60H 3/0085 62/126 |
| 2011/0267186 A1* | 11/2011 | Rao | B60K 28/08 340/449 |
| 2014/0121900 A1* | 5/2014 | Graubmann | B60H 1/00764 701/36 |
| 2014/0316651 A1* | 10/2014 | Cho | H02J 7/1423 701/36 |
| 2015/0306940 A1* | 10/2015 | Salter | B60J 7/0573 701/49 |
| 2017/0144506 A1* | 5/2017 | McGrath, Jr. | B60H 1/00778 |
| 2017/0158186 A1* | 6/2017 | Soifer | B60H 1/00742 |
| 2017/0282822 A1* | 10/2017 | Hunter, Jr. | B60H 1/00978 |
| 2020/0062080 A1* | 2/2020 | Hernandez | E05F 15/73 |

\* cited by examiner

METHOD AND SYSTEM FOR VARIABLY ADJUSTING INDOOR TEMPERATURE OF VEHICLE

CROSS-REFERENCE TO RELATED APPLICATION(S)

This application claims the benefit of Korean Patent Application No. 10-2018-0158359, filed on Dec. 10, 2018, which is hereby incorporated by reference as if fully set forth herein.

BACKGROUND

Field of the Invention

The present invention relates to a method and system for variably adjusting an indoor temperature of a vehicle, and more particularly, to a method and system for variably adjusting an indoor temperature of a vehicle based on characteristics of an object to be protected in the vehicle when a driver has turned off the engine and exited the vehicle.

Discussion of the Related Art

In recent years, accidents occurring inside vehicles are increasing. For example, when a long period of time has elapsed after a driver has turned off the engine and exited the vehicle in hot external temperatures, the life of children, pets or plants in the vehicle may be in danger due to a high temperature or explosive products such as cellular phones or lighters left in the vehicle by the driver may explode.

As another example, when a driver sleeps for a particular period of time while the engine is turned off in a season other than the summer (e.g., during colder temperatures), dizziness, vomiting or suffocation may occur due to lack of oxygen in the sealed interior of the vehicle. Another type of accident that may occur inside a vehicle is when a substantial period of time has elapsed after a driver has turned off the engine and exited the vehicle in cold winter, the life of children, pets or plants in the vehicle may be in danger due to a low temperature.

Accordingly, a method of automatically controlling the indoor temperature of a vehicle when a driver sets a sleep mode, and a control method thereof has been developed. In addition, a system for preventing a driver sleeping in a vehicle from dying due to suffocation to enhance the safety of the driver, and a control method thereof has been developed.

Another developed technique discloses an in-vehicle audio video navigation (AVN) system protection device and method capable of using a protruding AVN system, performance of which may be influenced by overheating caused by direct sunlight in hot summer weather or an extremely low temperature in cold winter, in a state of being protected against an extreme situation using an air conditioning system of a vehicle.

However, in the related art, since operation is performed in a state in which a driver is in the vehicle or in a state in which the ignition (IG) terminal of the key box of the vehicle capable of driving a relay to enable the charging function of the vehicle is in an ON state, the indoor temperature of the vehicle is unable to be adjusted when the driver turns off the key of the vehicle or when the key is not turned off but the vehicle is parked in a state in which the IG terminal is off. Even when operation is performed in a state in which a driver is in the vehicle or in a state in which the IG terminal is in an ON state, since the indoor temperature of the vehicle is adjusted based on the driver of the vehicle, it may be impossible to variably adjust the temperature to protect pets, plants or other explosive objects in the vehicle.

SUMMARY

Accordingly, the present invention provides a method and system for variably adjusting an indoor temperature of a vehicle. An object of the present invention provides a method and system for variably adjusting an indoor temperature of a vehicle based on characteristics of an object to be protected in the vehicle when a driver has turned off the engine and exited the vehicle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of variably adjusting an indoor temperature of a vehicle may include determining whether a current indoor temperature of the vehicle exceeds a predetermined allowable temperature of an object to be protected, switching an IG terminal of a key box of the vehicle to an ON state and calculating a sustainable time of indoor temperature control of the vehicle, in response to determining that the current indoor temperature of the vehicle exceeds the predetermined allowable temperature of the object to be protected, and adjusting the indoor temperature of the vehicle within a predetermined allowable temperature range or circulating indoor air of the vehicle according to the sustainable time.

In another aspect of the present invention, a system for variably adjusting an indoor temperature of a vehicle may include an object-to-be-protected detector (100) having a selective combination of at least one of a weight detection sensor (10), an indoor temperature automatic control switch (20), a microphone (30) and a speaker (40), and a controller (200) configured to determine an object to be protected in the vehicle based on a value detected by the object-to-be-protected detector (100), to determine a predetermined temperature as an allowable temperature according to the object to be protected, to determine whether a current indoor temperature of the vehicle exceeds the predetermined allowable temperature of the object to be protected, to switch an IG terminal of a key box of the vehicle to an ON state in response determining that the current indoor temperature of the vehicle exceeds the predetermined allowable temperature of the object to be protected, and to calculate a sustainable time of indoor temperature control of the vehicle, and to adjust the indoor temperature of the vehicle within a predetermined allowable temperature range or circulating indoor air of the vehicle according to the sustainable time.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
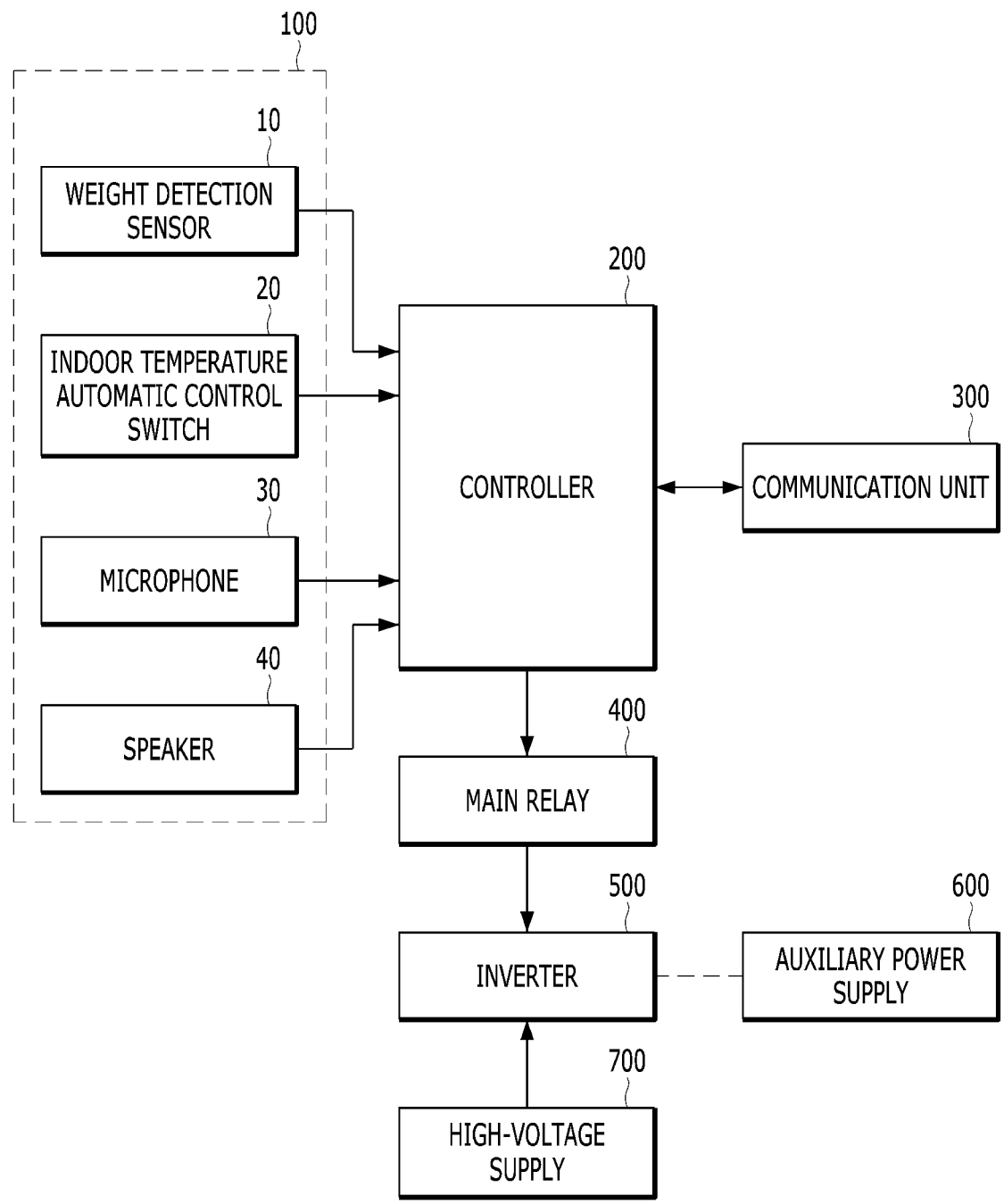
FIG. 1 is a block diagram showing a system for variably adjusting an indoor temperature of a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the exemplary embodiments of the present invention will be described in detail with reference to the accompanying drawings so as to be easily implemented by those skilled in the art. However, the present invention may be variously implemented and is not limited to the exemplary embodiments described herein. In the drawings, in order to clearly describe the present invention, portions which are not related to the description of the present invention will be omitted and similar portions are denoted by similar reference numerals throughout the specification. The same reference numbers will be used throughout the drawings to refer to the same or like parts.

Hereinafter, a method and system for variably adjusting an indoor temperature of a vehicle, which is applicable to the exemplary embodiments of the present invention, will be described in detail with reference to FIGS. 1 to 3. FIG. 1 is a block diagram showing a system for variably adjusting an indoor temperature of a vehicle according to an exemplary embodiment of the present invention.

Referring to FIG. 1, the system for variably adjusting the indoor temperature of the vehicle according to the present invention may include an object-to-be-protected detector 100 including a selective combination of at least one of a weight detection sensor 10, an indoor temperature automatic control switch 20, a microphone 30 or a speaker 40, a controller 200 and a communication unit 300.

Particularly, the weight detection sensor 10 of the object-to-be-protected detector 100 may be mounted within a seat of the vehicle to detect and transmit the weight of a person or a pet or other object located on the seat of the vehicle to the controller 200. In addition, the indoor temperature control switch 20 may be turned on by a user, such that the controller 200 adjusts the indoor temperature of the vehicle to a predetermined temperature or performs ventilation process. The microphone 30 may be configured to receive an audio signal from a person or a pet inside the vehicle and transmit the audio signal to the controller 200.

The speaker 40 may then be configured to output a predetermined audio signal to the interior of the vehicle in a specific situation, under operation of the controller 200. The controller 200 may be configured to compare a current indoor temperature of the vehicle with a predetermined allowable temperature, switch the IG terminal of the vehicle to the ON state when the current indoor temperature of the vehicle exceeds the allowable temperature, calculate a sustainable time of indoor temperature control of the vehicle, and adjust the indoor temperature of the vehicle within the allowable temperature with the authorization of the vehicle user.

In the exemplary embodiment of the present invention, the allowable temperature may be determined as the allowable temperature of the object to be protected in the vehicle. The allowable temperature information of each object to be protected may be transmitted to the controller 200 via Internet of things (IOT) technology or Bluetooth communication. When a person or a pet is within the vehicle, the presence may be determined by change in weight of the vehicle seat using the weight detection sensor 10, the On/Off state of the indoor temperature automatic control switch 20 provided within the vehicle, or the audio signal recognized using the microphone 30 provided within the vehicle, and the allowable temperature may be determined to be a temperature at which the person or pet may survive.

Meanwhile, operation of calculating the sustainable time of indoor temperature control of the vehicle will be described in detail. The controller 200 may be configured to calculate required power of each time zone based on an outside temperature, the allowable temperature and weather information (e.g., temperature and humidity), for the sustainable time. In addition, the controller 200 may be configured to calculate available power based on the power of the state of charge (SoC) of an auxiliary power supply 600, such as a 12 V battery, and a high-voltage battery 700, external chargeable power and the fuel level of the vehicle (see FIG. 3).

Thereafter, the controller may be configured to cumulatively calculate required power for setting the indoor temperature of the vehicle to an allowable indoor temperature with respect to an outside temperature using weather information as shown in Table 1 below.

TABLE 1

| allowable temperature | outside temperature | | | | | | | | |
|---|---|---|---|---|---|---|---|---|---|
| | −50 | −30 | −10 | 0 | 10 | 30 | 50 | 70 | 90 |
| −40 | 1 kw | 1 kw | | | | | | | |
| −20 | 1 kw | 1 kw | | | | | | | |
| 0 | | | 1 kw | | | | | | |
| 20 | | | | 1 kw | | | | | |
| 40 | | | | | 1 kw | | | | |
| 60 | | | | | | 5 kw | 4 kw | 3 kw | 2 kw |
| 80 | | | | | | 4 kw | 3 kw | 2 kw | 1 kw |

As shown in Table 1, a time when cumulative required power becomes equal to the available power may be set as a sustainable time.

In one exemplary embodiment of the present invention, as the result of calculating available power, the available power of the auxiliary battery may be 5 kwh*50% (SoC)=2.5 kwh, the available power of the high-voltage battery may be 20 kwh*50% (SoC)=10 kwh, and external chargeable power (e.g., solar panel charging or external charging) may be 2.5 kwh, and available power may be 15 kwh.

In addition, the communication unit 300 may be configured to transmit the calculated sustainable time to the user of the vehicle under operation of the controller 200 and transmit an approval signal received from the user of the vehicle to the controller 200. Accordingly, the controller 200 may be configured to adjust the indoor temperature of the vehicle within the allowable temperature in response to receiving the approval signal.

Figure 2:
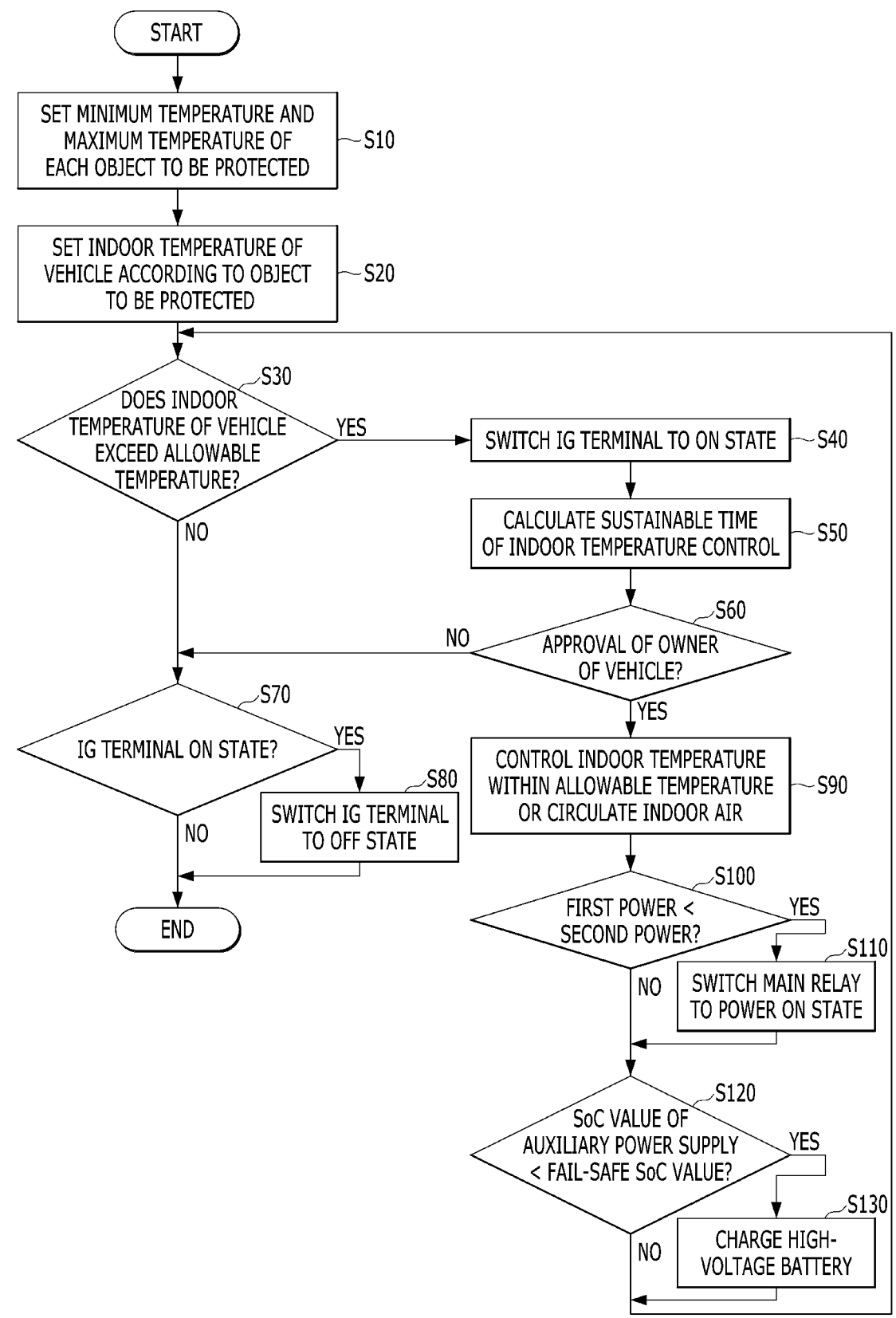
FIG. 2 is a flowchart illustrating a method of variably adjusting an indoor temperature of a vehicle according to an exemplary embodiment of the present invention.
Figure 3:
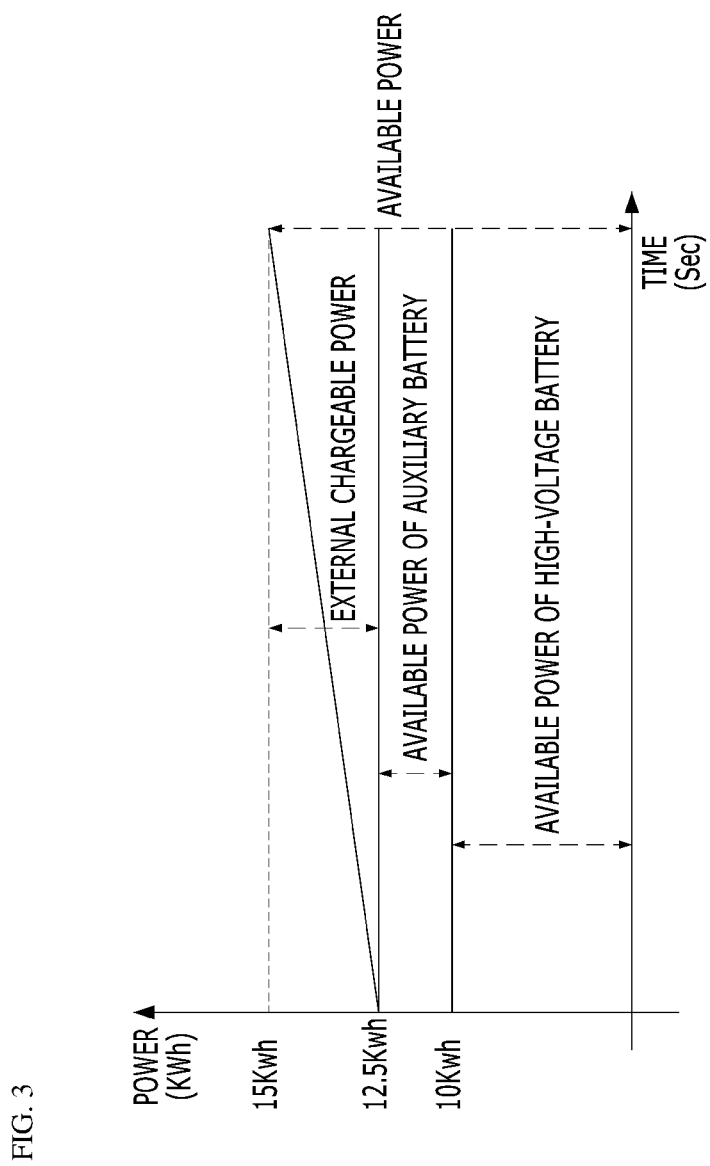
FIG. 3 is a graph illustrating operation of calculating a sustainable time in a procedure of variably adjusting an indoor temperature of a vehicle according to an exemplary embodiment of the present invention.

FIG. 2 is a flowchart illustrating a method of variably adjusting an indoor temperature of a vehicle according to an exemplary embodiment of the present invention. Referring to FIG. 2, a user may operate an input unit (e.g., user interface) provided in the controller 200 and set a minimum temperature and a maximum temperature of each object to be protected (S10). In other words, the controller may be configured to receive a user input via a user interface. For example, the minimum allowable temperature and the maximum temperature may be set to about 5° C. or 33° C. when the object to be protected is a person or a pet and may be set to about 0° C. or 25° C. when the object to be protected is a plant or other similar object.

Subsequently, the user may operate the input unit provided in the controller 200 and set the indoor temperature of the vehicle according to the object to be protected (S20). For example, the indoor temperature of the vehicle may be set to about 20° C. when the object to be protected is a person or a pet and may be set to about 15° C. when the object to be protected is or a plant or similar object. Subsequently, the controller 200 may be configured to determine whether the current indoor temperature of the vehicle exceeds a predetermined allowable temperature of the object to be protected (S30).

In response to determining that the current indoor temperature of the vehicle exceeds the predetermined allowable temperature of the object to be protected in step S30, the controller 200 may be configured to switch the IG terminal to the ON state (S40) and calculate the sustainable time of the indoor temperature control of the vehicle (S50). Subsequently, the controller 20 may be configured to determine whether the user of the vehicle approves operation of adjusting the indoor temperature of the vehicle using the calculated sustainable time information (S60). Particularly, the controller 20 may be configured to transmit the calculated sustainable time information to the terminal of the user via the communication unit 300 and receive approval information from the terminal of the use of the vehicle or use a set value pre-set by the user of the vehicle.

Subsequently, in response to determining that the current indoor temperature of the vehicle is less than the predetermined allowable temperature of the object to be protected in step S30 or when the use of the vehicle does not approve the operation, the controller 200 may be configured to determine whether the IG terminal is in the ON state (S70). In response to determining that the IG terminal is not in the ON state (e.g., is in an OFF state), the operation of variably adjusting the indoor temperature of the vehicle may be completed. In contrast, in response to determining that the IG terminal is in the ON state, the IG terminal may be switched to the OFF state (S80) and the operation of variably adjusting the indoor temperature of the vehicle may be completed.

Furthermore, in response to determining that the user of the vehicle approves the operation in step S60, the controller 200 may be configured to adjust the indoor temperature of the vehicle in the predetermined allowable temperature range or circulate the indoor air of the vehicle (S90). A target temperature for temperature control may be set within the allowable temperature value. The controller 200 may be configured to operate a fully automatic temperature control (FATC) device to adjust the temperature of the vehicle to the target temperature.

Subsequently, the controller 200 may be configured to compare the first power of the auxiliary power supply 600 (e.g., 12 V battery) provided in the vehicle with the second power for maintaining the ON state of the IG terminal to determine whether the first power is less than the second power (S100). In response to determining that the first power of the auxiliary power supply 600 is less than the second power for maintaining the ON state of the IG terminal in step 100, the controller 200 may be configured to switch a main relay 400 to the power on state (S110), to charge the auxiliary power supply 600 with high-voltage power through an inverter 500 provided within the vehicle.

However, in response to determining that the first power of the auxiliary power supply 600 is greater than the second power for maintaining the ON state of the IG terminal in step 100 or after step S110, the controller 200 may be configured to determine whether the state of charge (SoC) value of the auxiliary power supply 600 is less than a fail-safe SoC value (e.g., HEV 10% or PHEV 7%) (S120). In response to determining that the state of charge (SoC) value of the auxiliary power supply is less than the fail-safe SoC value in step S120, the high-voltage battery 700 may be charged using an engine idle charger provided within the vehicle or a separate external charger (S130).

According to the exemplary embodiment of the present invention, it may be possible to variably adjust the indoor temperature of the vehicle according to the characteristics of the object to be protected in the vehicle when the driver has turned off the engine and exited the vehicle. The method and system for variably adjusting the indoor temperature of the vehicle according to the present invention provides the following effects.

First, when a driver has turned off the engine and exited the vehicle, it may be possible to variably adjust the indoor temperature of the vehicle according to characteristics of an object to be protected in the vehicle. Accordingly, by recognizing a situation in which a person or a pet is in the vehicle, it may be possible to prevent the person or the pet from being injured due to suffocation or a high or low temperature through ventilation or temperature control.

In addition, by recognizing in advance items which may explode at an extreme temperature causing a fire in the vehicle, it may be possible to prevent accidents occurring inside the vehicle. Since the temperature control sustainable time of the inside of the vehicle may be calculated, in response to determining that the sustainable time is limited due to the problem of a battery, etc., it may be possible to control the high-voltage battery to charge the auxiliary power supply.

The invention may also be embodied as computer readable code on a non-transitory computer readable recording medium. The non-transitory computer readable recording medium is any data storage device that can store data which can thereafter be read by a computer system. Examples of the computer readable recording medium include read-only memory (ROM), random-access memory (RAM), CD-ROMs, magnetic tapes, floppy disks, optical data storage devices, and carrier waves (such as data transmission over the Internet).

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of variably adjusting an indoor temperature of a vehicle, comprising:
   determining, by a controller, whether a current indoor temperature of the vehicle exceeds a predetermined allowable temperature of an object to be protected;
   switching, by the controller, an ignition (IG) terminal of a key box of the vehicle to an ON state and calculating a sustainable time of indoor temperature control of the vehicle based on at least a required power of the vehicle, an outside temperature, the predetermined allowable temperature, and an available power, the available power being calculated based on a power state of an auxiliary power supply provided in the vehicle, in response to determining that the current indoor temperature of the vehicle exceeds the predetermined allowable temperature of the object to be protected; and
   adjusting, by the controller, the indoor temperature of the vehicle within a predetermined allowable temperature range or circulating indoor air of the vehicle according to the sustainable time.

2. The method according to claim 1, further comprising, after calculating the sustainable time:
   determining, by the controller, whether user authorization is received for adjusting the indoor temperature of the vehicle using the sustainable time; and
   adjusting, by the controller, the indoor temperature of the vehicle within a predetermined allowable temperature range or circulating indoor air of the vehicle, when user authorization is received.

3. The method according to claim 1, further comprising:
   comparing, by the controller, first power of the auxiliary power supply with second power for maintaining the ON state of the IG terminal to determine whether the first power is less than the second power;
   switching, by the controller, a main relay provided in the vehicle to a power on state to charge the auxiliary power supply with high-voltage power, when the first power of the auxiliary power supply is less than the second power for maintaining the ON state of the IG terminal;
   determining, by the controller, whether a state of charge (SoC) value of the auxiliary power supply is less than a fail-safe SoC value when the first power of the auxiliary power supply is greater than the second power for maintaining the ON state of the IG terminal, and
   charging, by the controller, a high-voltage battery provided in the vehicle using an engine idle charger provided in the vehicle or an external charger, in response to determining that the SoC value of the auxiliary power supply is less than the fail-safe SoC value.

4. The method according to claim 1, wherein, in the predetermined allowable temperature of the object to be protected, the object to be protected in the vehicle is determined using a selective combination of at least one of a weight detection sensor, an indoor temperature automatic control switch, a microphone and a speaker provided within the vehicle, and a predetermined temperature is determined as the allowable temperature according to the object to be protected.

5. A system for variably adjusting an indoor temperature of a vehicle, comprising:
   an object-to-be-protected detector including a selective combination of at least one of a weight detection sensor, an indoor temperature automatic control switch, a microphone and a speaker; and
   a controller configured to:
      determine an object to be protected in the vehicle based on a value detected by the object-to-be-protected detector;
      determine a predetermined temperature as an allowable temperature according to the object to be protected;
      determine whether a current indoor temperature of the vehicle exceeds the predetermined allowable temperature of the object to be protected;
      switch an ignition (IG) terminal of a key box of the vehicle to an ON state in response to determining that the current indoor temperature of the vehicle exceeds the predetermined allowable temperature of the object to be protected and
      calculate a sustainable time of indoor temperature control of the vehicle based on at least a required power of the vehicle, an outside temperature, the predetermined allowable temperature, and an available power, the available power being calculated based on a power state of an auxiliary power supply provided in the vehicle and adjust the indoor temperature of the vehicle within a predetermined allowable temperature range or circulate indoor air of the vehicle according to the sustainable time.

6. The system according to claim 5, further comprising:
a communication unit configured to transmit information regarding operation of adjusting the indoor temperature of the vehicle using the sustainable time to a user of the vehicle under operation of the controller and configured to receive approval or rejection information for the operation of adjusting the indoor temperature of the vehicle from a user terminal of the vehicle.

7. The system according to claim 5, wherein the controller is configured to:
compare first power of the auxiliary power supply with second power for maintaining the ON state of the IG terminal to determine whether the first power is less than the second power;
switch a main relay provided in the vehicle to a power on state to charge the auxiliary power supply with high-voltage power when the first power of the auxiliary power supply is less than the second power for maintaining the ON state of the IG terminal;
determine whether a state of charge (SoC) value of the auxiliary power supply is less than a fail-safe SoC value when the first power of the auxiliary power supply is greater than the second power for maintaining the ON state of the IG terminal; and
charge a high-voltage battery provided in the vehicle using an engine idle charger provided in the vehicle or an external charger, in response to determining that the SoC value of the auxiliary power supply is less than the fail-safe SoC value.

\* \* \* \* \*